(12) United States Patent
Patel et al.

(10) Patent No.: US 8,404,291 B2
(45) Date of Patent: Mar. 26, 2013

(54) METHOD FOR USE OF A FOOD PREPARATION DEVICE

(75) Inventors: Malay A. Patel, Cochranville, PA (US); John M. Squeri, Downingtown, PA (US)

(73) Assignee: W. L. Gore & Associates, Inc., Newark, DE (US)

( * ) Notice: Subject to any disclaimer, the term of this patent is extended or adjusted under 35 U.S.C. 154(b) by 692 days.

(21) Appl. No.: 12/565,791

(22) Filed: Sep. 24, 2009

(65) Prior Publication Data

US 2010/0015314 A1  Jan. 21, 2010

Related U.S. Application Data

(60) Division of application No. 11/671,072, filed on Feb. 5, 2007, which is a continuation-in-part of application No. 11/349,770, filed on Feb. 8, 2006, now abandoned.

(51) Int. Cl.
*A23L 1/01* (2006.01)

(52) U.S. Cl. ............... 426/237; 426/244; 426/246

(58) Field of Classification Search ............ 426/237, 426/244, 246
See application file for complete search history.

(56) References Cited

U.S. PATENT DOCUMENTS

| | | | |
|---|---|---|---|
| 3,953,566 A | 4/1976 | Gore | 264/288 |
| 4,320,699 A | 3/1982 | Binks | |
| 4,700,619 A | 10/1987 | Scanlon | 99/349 |
| 5,141,800 A | 8/1992 | Effenberger et al. | 442/261 |
| 5,374,473 A | 12/1994 | Knox et al. | 428/218 |
| 2002/0017516 A1 | 2/2002 | McKenn et al. | |
| 2005/0089617 A1 | 4/2005 | Unwin | |
| 2005/0186367 A1 | 8/2005 | Hanrahan | |
| 2005/0238872 A1 | 10/2005 | Kennedy et al. | |

FOREIGN PATENT DOCUMENTS

WO   WO 99/41071   8/1999
WO   WO 01/45541   6/2001

OTHER PUBLICATIONS

PCT International Search Report No. PCT/US2007/003521.

*Primary Examiner* — Brent O'Hern
(74) *Attorney, Agent, or Firm* — James Arnold, Jr.

(57) ABSTRACT

A method for using a novel dense PTFE article in the form of a surface for a food preparation device is described in one embodiment, the surface being fabricated from a sheet of PTFE with a thermal resistance of 1.3° C. in$^2$/W or less and having desirable tensile strength.

8 Claims, 3 Drawing Sheets

METHOD FOR USE OF A FOOD PREPARATION DEVICE

RELATED APPLICATIONS

The present application is a divisional application of U.S. patent application Ser. No. 11/671,072 filed Feb. 5, 2007 which is a continuation-in-part application of U.S. patent application Ser. No. 11/349,770, filed Feb. 8, 2006 now abandoned.

FIELD OF THE INVENTION

The present invention relates to surfaces for food preparation devices, and more particularly to a surface fabricated from a dense polytetrafluoroethylene ("PTFE") sheet or film which exhibits improved tensile properties, improved thermal resistance, improved non-enzymatic browning, easy release and is resistant to tearing, nicking and scratching.

BACKGROUND OF THE INVENTION

Non-enzymatic browning is a chemical process that produces a brown color in foods without the activity of enzymes. The two main forms of non-enzymatic browning are carmelization and the Maillard reaction. The objectives in cooking meats and other food products, such as hamburgers, etc., is to achieve: (1) good sear on the surface of the food for enhanced flavor, (2) proper internal temperature of the product to ensure against any bacterial contamination, and (3) minimized cooking time to improve speed of service to customer.

Searing is a browning of the meat or other food surface through a process known as the Maillard reaction. When cooking meat, the combination creates the "meaty" flavor and typically changes the color of the food surface. The Maillard reaction occurs most readily at around 300° F. (150° C.) and above. When meat is cooked, the outside reaches a higher temperature than the inside, triggering the Maillard reaction and creating the strongest flavors on the surface. Better sear results in more flavors, which is typically regarded in the industry as a better tasting product.

However, in the case of cooking grills in rapid service restaurants, because water in the form of ice crystals is present at the surface of a frozen meat patty, the initial heat transferred by the cooking platen is used to boil the water off (212° F.), thus inhibiting or delaying the Maillard reaction. This adds time to the cooking to achieve the desired sear. Accordingly, it is desired to minimize the thermal resistance of the cooking surface in contact with the product to allow for desired searing while still attaining needed internal temperature of the foods in the shortest time possible.

The advantage of using PTFE in food preparation devices, such as clamshell-type grills which cook food at high temperatures, is well-known. PTFE has also exhibited utility as a material for use in harsh chemical environments where other polymers quickly degrade. Moreover, PTFE also has a useful operating temperature range from as high as 260° C. to as low as near minus 273° C.

Conventionally, one method to create a non-stick surface on the cooking surface of the grill is to secure a sheet fabricated from conventional non-porous PTFE over the cooking surface. A more common method to create a non-stick surface is to spray the surface, such as a metal or fiberglass substrate, with PTFE, PFA, FEP or other non-stick coatings and bake to solidify. The spray and bake coatings are more susceptible to scratching than a PTFE sheet. While the PTFE sheet prevents sticking of the item being cooked (e.g., hamburgers) to the cooking surface, the sheet is subject to tearing, nicking and scratching, which causes deterioration of the easy release quality of the PTFE. This is attributable to the fact that PTFE is characterized by poor mechanical properties such as low tensile strength, poor cold flow resistance or creep resistance, poor cut-through and abrasion resistance and a general poor mechanical integrity that precludes its consideration in many materials engineering applications. Low porosity PTFE articles have been made in the past through use of a skiving process in which solid PTFE films are split or shaved from a thicker preformed article. These articles are characterized by low strength, poor cold flow resistance, and poor load bearing capabilities in both the length and width dimensions of the film.

A PTFE material, specifically, expanded polytetrafluoroethylene, may be produced as taught in U.S. Pat. No. 3,953,566. Expanded porous polytetrafluoroethylene ("ePTFE") has a microstructure consisting of nodes interconnected by fibrils. It is of higher strength than unexpanded PTFE but retains the chemical inertness and wide useful temperature range of unexpanded PTFE.

However, ePTFE is porous and hence is less effective as a food preparation surface and cannot be used as a barrier layer to low surface tension fluids since such fluids with surface tensions less than 50 dyne-cm pass through the pores of the membrane.

Compressed ePTFE articles are taught in U.S. Pat. No. 3,953,566 in which a platen press is used to densify a thin sheet of ePTFE with and without heat. However, cold flow occurs in the press and nonuniform parts result and a density of over 2.0 g/cc is difficult to achieve. Also the use of such a platen press greatly limits the scope of width and length of final product which may be produced. Factors including platen parallel surfaces, and ePTFE unit weight variance are also limiting factors with respect to the production of uniformly dense PTFE articles. The ePTFE sheet used in U.S. Pat. No. 3,953,566 was stretched or strengthened in only one direction and hence the utility of the finished article was severely limited.

In U.S. Pat. No. 5,374,473 to Knox et al., a method is described for producing articles of dense ePTFE by placing 2 or more layers of porous ePTFE inside a heat and pressure stable flexible container, evacuating gas from the chamber, subjecting chamber to a pressure of 150 to 350 psi (1034 KPa to 2413 KPa) and temperature from 368 C to 400 C, then cooling the container while reducing pressure. This method of manufacture is mechanically similar to the platen press method cited in U.S. Pat. No. 3,953,566. The scope of length and width which is achievable is clearly limited by the size of the platen press or pressurized container, and the uniformity of the density of the final article is limited by the parallel of the plates used to impart compressive pressure, as well as by the unit weight variance of the porous ePTFE sheet used. These factors serve to further limit the geometrical stature of the final dense ePTFE sheet.

Commercial products currently available from W.L. Gore and Associates, Inc. include a dense fluoropolymer film exhibiting barrier properties. The first product comprises a PTFE barrier layer bonded between two porous PTFE layers. The second product comprises a PTFE barrier layer bonded on one side to a thermoplastic layer such as FEP (fluoroethylene propylene), PFA (perfluoroacrylate) or THV (a polymer of tetrafluoroethylene, hexafluoropropylene and vinylidene fluoride). The barrier layer in these commercial products is a film of high water vapor resistance (i.e., low water vapor permeation) PTFE having good tensile properties in orthogonal directions. This barrier layer has a density of 2.0 g/cc or greater, is substantially free of pores, and has a tensile strength of about 8000 psi (55,000 KPa) or greater, more preferably a tensile strength of about 10,000 psi (69,000 KPa) or greater in two orthogonal directions. Mechanical properties such as dimensional stability of these materials have been tailored to meet a range of performance requirements. These materials have been successfully implemented in a number of applications requiring flexible, thin materials with good chemical resistance and water vapor permeation resistance.

Despite the advances in PTFE materials capabilities, a long-felt need has existed for improved surfaces for food preparation devices, such as grill covers, which exhibit a unique combination of easy release, improved thermal resistance, improved non-enzymatic browning, improved tensile properties, and resistance to tearing, nicking and scratching in use.

SUMMARY OF THE INVENTION

One objective of this invention is to provide an improved surface to a food preparation device having a cooking surface wherein the improved surface is positioned over the cooking surface to create an easy release surface. The improved surface of the present invention, as compared to prior art cooking surfaces, exhibits enhanced life, is easy to clean using conventional techniques for cleaning easy release (e.g., non-stick) surfaces, is resistant to tearing, nicking and scratching, and also provides enhanced non-enzymatic browning (hereinafter "browning") to foods during cooking.

As mentioned earlier herein, the sear quality of foods is desired to enhance the flavor of cooked meats and other food products. Materials of the present invention provide better browning, and can be used to cook food in the same or shorter cooking times than conventional cooking surfaces, while attaining the proper internal temperatures.

This invention utilizes dense PTFE sheets (e.g., 2.0 g/cc or greater, more preferably 2.1 g/cc or greater) having optimized thermal resistance properties to achieve improved browning of cooked foods along with improved tensile strength. Materials of the invention exhibit thermal resistance of about 1.3° C. in$^2$/W or less, more preferably of about 1° C. in$^2$/W or less, and most preferably 0.5° C. in$^2$/W or less. Improved tensile strength in combination with high density is of utility in applications requiring improved flex life, load bearing, impact and rupture resistance, notch propagation resistance, cut-through resistance, and abrasion resistance. Improved tensile strengths in at least one direction, more preferably in two orthogonal directions (e.g., the width and length directions), are provided for dense PTFE sheets without the requirement for reinforcing materials that compromise the chemical performance and release properties of the finished article. Articles of the present invention may exhibit matrix tensile strengths of about 10,000 psi (69,000 KPa) or greater, more preferably matrix tensile strengths of about 15,000 psi (103,000 KPa) or greater in at least one direction. Alternatively, articles of the present invention may exhibit matrix tensile strengths of at least 8,000 psi (55,000 KPa) in two orthogonal directions. In addition to tensile strength, resistance to tearing upon notching, cutting, nicking, etc., is desirable in certain embodiments of the present invention. Particularly, materials of the invention tend to resist propagation of a tear upon damage (unlike porous expanded PTFE materials), which further enhances or extends the life of the present devices. Materials with a tear resistance on the order of 1 lb/mil or more in at least one direction are useful in certain embodiments of devices of the present invention. Thicknesses of the device can vary depending on the requirements of a particular cooking system; however, suitable thicknesses of the food preparation devices of the present invention may be on the order of 0.003 inch (0.076 mm) or less, more preferably 0.002 inch (0.05 mm) or less, more preferably 0.0005 inch (0.013 mm) or less, and can even be as low as 0.0002 inch (0.0051 mm) or less. Accordingly, this invention provides for a finished surface for a food preparation device with greater tensile strengths in at least one direction and high density, thus greater toughness, with the excellent chemical and thermal characteristics of traditional dense PTFE sheets or films of lower tensile strength. The ability to maintain at least some dimensional stability upon heating of the materials is a further advantage of these materials. Sheets and films of the invention can be made in unusually thin form and smooth finish to provide similar or slightly greater toughness than prior art PTFE materials while improving browning. Additionally, a further advantage of the present invention is the ability to lower overall cooking times.

Thus, the invention is directed to the use of this mechanically improved PTFE film as food preparation surfaces. This improved food preparation surface may be provided in one embodiment of the invention by releasably attaching, e.g., by spring attachment or other temporary mechanical fastening techniques, a sheet as described to a food preparation surface (e.g., a contact cooking grill surface/platen) or may be laminated to a cooking substrate.

In another embodiment, the product is a sheet of a sintered or unsintered, high density, high tensile strength PTFE laminated to another substrate. Lamination can be achieved by adhering other films, by compressing powders, or the like. Specifically, this other substrate may include a thermoplastic fluoropolymer sheet or film such as FEP, PFA, or other fluoropolymers. It may be metallic, glass or an inorganic sheet, etc. The sheet may also be laminated to a metal substrate such as an aluminum plate and fastened over the heating element so that it can be easily removed and replaced. The sheet can be attached with a high temperature adhesive such as PFA, FEP or other fluoropolymers, or alternatively with non-fluoropolymer adhesives such as silicone, acrylics, epoxies, etc., to enable it to be laminated to a substrate.

At least one additive, such as pigments and the like, can be present within the PTFE sheet or in an adhesive or coating applied to the PTFE sheet. For example, the additive can be added to the PTFE resin prior to extrusion or to the PTFE after extrusion. Alternatively, an additive can be included in or on an adhesive or coating.

DETAILED DESCRIPTION OF THE INVENTION

Figure 1:
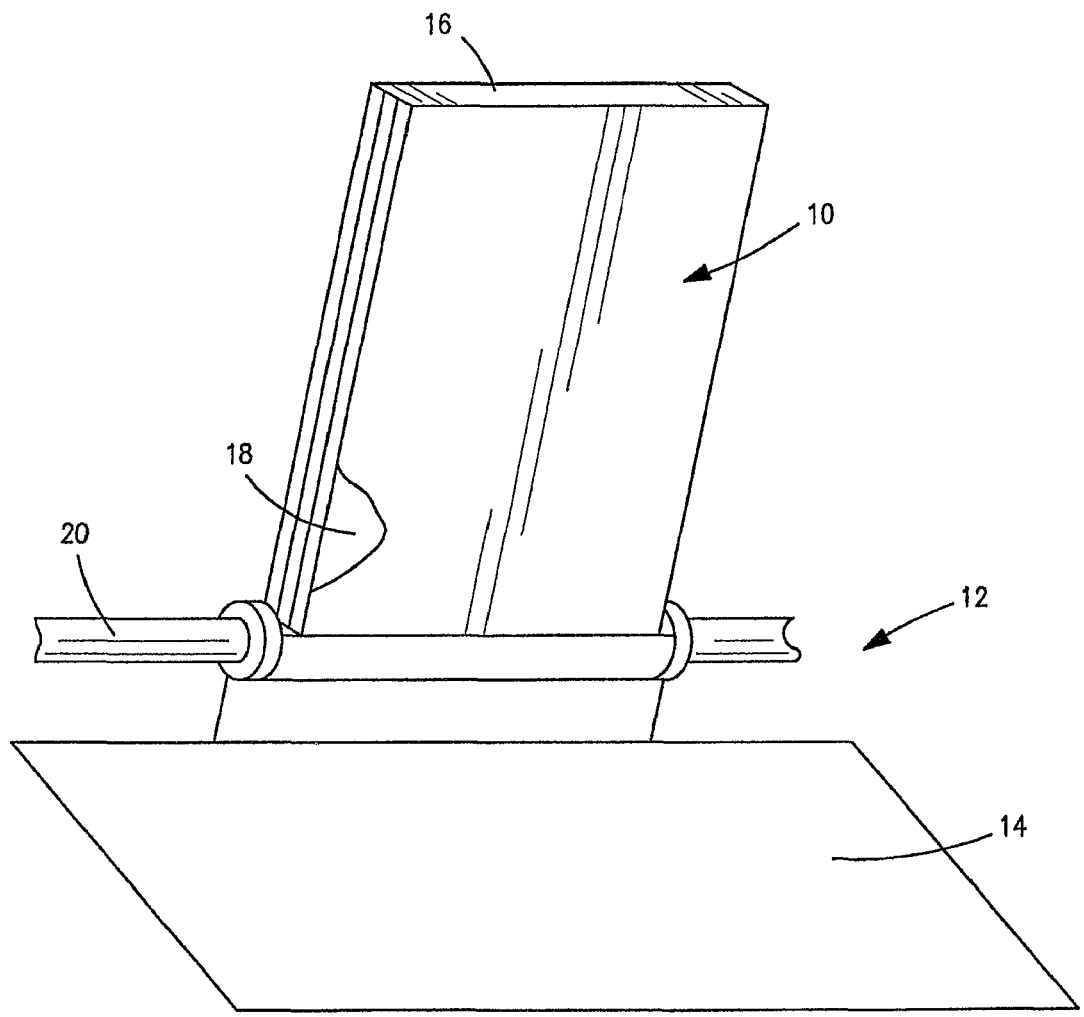
FIG. 1 is a perspective view of a food preparation device on which the surface of the present invention is mounted.

Referring now to the drawings, and more particularly to FIGS. 1 and 2, there is generally indicated at 10 a surface which is releasably attached to a food preparation device, generally indicated at 12. The removable surface 10 provides an easy release cooking surface for preparing foods, and will be discussed in greater detail below.

As shown in FIG. 1, the food preparation device 12 is a clamshell-type grill comprising a main, horizontal cooking surface 14, and a pivotal cover 16 movable between its shown open position in FIG. 1 in which it is spaced from the main cooking surface 14 and a closed position in which it is parallel to the main cooking surface. The cover 16 has a downwardly facing cooking surface 18 which faces the main cooking surface 14 when the cover is in its closed position. The arrangement is such that when cooking an item (not shown), such as a hamburger, for example, on the main cooking surface 14, heat is generated from the main cooking surface and the cover cooking surface 18 for cooking the item quickly and evenly. The cover 16 is fixedly mounted on a shaft or rod 20 for achieving its pivotal movement. The grill device 12 depicted in FIG. 1 is well-known in the art; however, it should be understood that the removable surface 10 of the present invention can be mounted on any cooking device having a cooking surface where it is desired to provide a durable, easy release, easy to clean surface. In fact, a removable surface of this invention can also be attached to the main cooking surface 14 by a suitable means in order to enhance this surface as well.

Figure 2A:
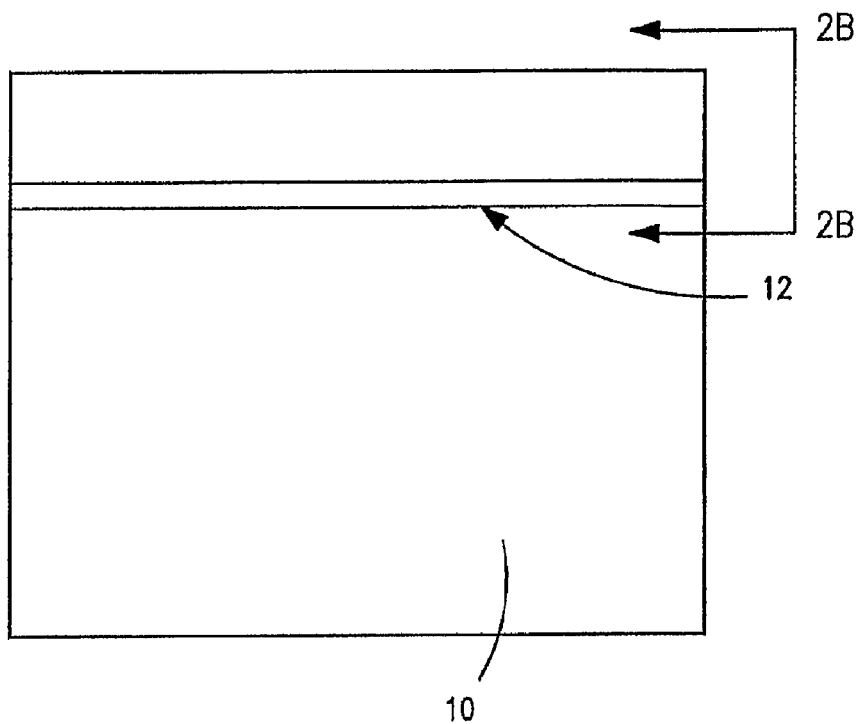
FIGS. 2A and 2B depict perspective views of a removable grill cover.
Figure 2B:
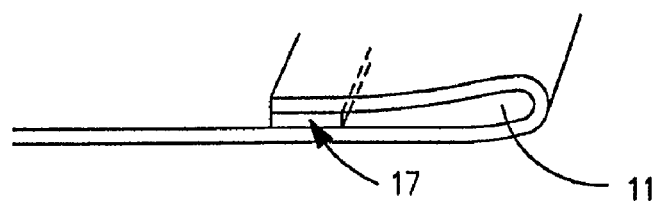

Referring particularly to FIG. 2A, there is shown an article generally indicated at 10 for covering a cooking surface 18 of FIG. 1 with a removable non-stick surface. As shown in perspective side view along line 2B-2B, as shown in FIG. 2B, the article 10 includes a loop forming a tunnel 11 into which a stainless steel rod may be inserted and used to attach the article 10 to the hinged side of the cover 16 of FIG. 1. Once attached, the article 10 is pulled across the cooking surface 18 and attached to the front of the cover 16 by two clips which simply hold the sheet in place using friction. The loop 11 is formed by heat bonding the full density ePTFE film with PFA as an adhesive 17 and heat and pressure, such as described in more detail in the Examples herein.

Figure 3:
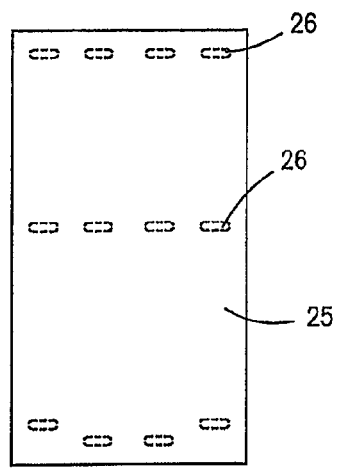
FIG. 3 depicts a platen shoe for use with a sheet of the invention.

An alternative method of attaching a removable non-stick surface is shown in FIG. 3. The article generally indicated at 25 is a metal platen or sheet, such as aluminum, copper or other suitable metal, with high density, high tensile strength ePTFE bonded to the cooking surface (not shown). The metal platen 25 is attached to the lid 16 in FIG. 1 with "T" head bolts that are inserted in undercut slots 26 in the back side of the platen 25. The bolts are inserted through holes in the lid 16 and secured with nuts to hold the metal platen firmly in place.

It should be understood that any device or apparatus may be provided for securing the surface 10 to the cover 16 (or any cooking surface in general) and still fall within the scope of the present invention.

Figure 4A:
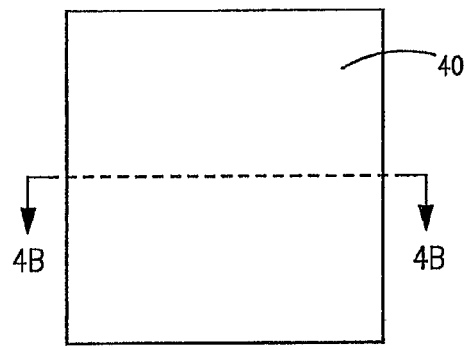
FIGS. 4A and 4B depict a food preparation device of the present invention in the form of a belt.
Figure 4B:
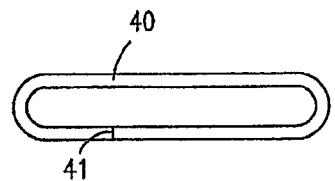

In a further alternative embodiment of the invention, it is contemplated that the device can be configured in the form of a belt for conveying and at least partially cooking foods, depending on the configuration of the cooking device employed. FIG. 4A shows a top perspective view of a belt 40, and FIG. 4B shows a cross-sectional view along line a-a of the looped belt 40 with seam 41. Alternatively, in a further embodiment of the invention, it is contemplated that the device could be configured in the form of a cooking sheet or other comparable cooking surface.

The present invention will be further described with respect to the non-limiting Examples provided below.

Test Methods and Measurements

Tensile Strength

All specimens were tested according to the general teachings of ASTM D 882-02. A 20 in/min (508 mm/min.) crosshead speed, 2 in (51 mm) gauge length and rectangular specimen of at least 4 inches (102 mm) in length were employed.

Tensile Strength (psi)=Max load (lb)/specimen cross-sectional area (in$^2$), where, Max load=Maximum load specimen generates during testing.

The average of three measurements was used.

Thickness

Membrane thickness was measured by placing the membrane between the two plates of a Kafer FZ1000/30 thickness snap gauge (Käfer Messuhrenfabrik GmbH, Villingen-Schwenningen, Germany). The average of three measurements was used.

Density

Samples die cut to form rectangular sections 2.54 cm by 15.24 cm were measured to determine their mass (using a Mettler-Toledo analytical balance Model AG204) and their thickness (using a Kafer FZ1000/30 snap gauge). Using these data, density was calculated with the following formula:

$$\rho = \frac{m}{w * l * t}$$

in which: $\rho$=density (g/cc); m=mass (g); w=width (cm); l=length (cm); and t=thickness (cm). The average of three measurements was used.

Tear Resistance

Tear resistance was measured by generally following ASTM D1938-02 "Trouser tear." This test method covers the determination of the force necessary to propagate a tear in plastic film and thin sheeting (thickness of 1 mm (0.040 in) or less) by a single tear method. The force to propagate a tear across a film was measured using a constant-rate-of-grip separation machine (Instron Model No. 5565, Serial Number C3416) as described in ASTM D882-02 (tensile test) and was tabulated using the maximum value achieved from a load-time chart. A 1 inch (25.4 mm) wide specimen was cut into a 3 inch (76 mm) length in the direction to be tested. Within the 3 inch (76 mm) section, a 2 inch (51 mm) slit was made down the center of the specimen in the length direction. The two tabs were then placed in the measuring jaws 180 degrees apart from each other. The measuring jaws were then pulled at the rate specified by ASTM D1938-02 which is 10 in/min. The maximum values were then recorded from the load-time test. The average of three measurements was used.

Thermal Resistance

Thermal Resistance was measured based generally upon EIA/JEDEC Standard 51 "Methodology for the Thermal Measurement of Component Packages" for a single semiconductor device in forced convection. To perform the test, a test rig was assembled so that a controlled heat generating device (a Arcol 100 W power resistor) was oriented below a heat sink (a 70 mm high EKL heat sink p/n 21204021004). Samples to be tested were oriented between the heat generating device and the heat sink with thermocouples embedded in the case and heat sink approximately 1 mm above and below the test sample. The thermocouples were embedded by drilling approximately 1 mm holes and inserting the thermocouples so they were centered over the sample. Forced convection through the sample was achieved by supplying 12V DC to a fan mounted above the heat sink.

To perform the test, a 1 inch square test sample of material was held under a compressive load of 22 psi between the heat generating device and the heat sink. Enough current was supplied to the heat generating device until a steady state power supply temperature of about 75° C. was reached. An axial temperature gradient was established through the test sample as heat flowed from the lower power resistor surface through the test sample into the heat sink. The temperature drop from the heat generating device, or case, to the heat sink through the sample, referred to as delta T, was measured by the thermocouples located on both sides of the sample. After steady state temperature was reached, typically a minimum of 30 minutes, the case temperature and the heat sink temperature were measured. Also the voltage across the power resistor and the electrical current were measured, which were used to calculate the power dissipated (W (voltage×current)) by the heat generating device. A thermal resistance was determined by the ratio of (delta T/W). Thermal resistance was reported as ° C.-in$^2$/W.

EXAMPLES

Example 1

In this example, as described in more detail below, loose covers for the upper surface of a clamshell grill (Garland Electric Xpress Grill, Model XE24, Garland Commercial Industries, Freeland, Pa.) were designed with one folded and bonded edge. This edge created a tunnel through which an aluminum rod was inserted. The rod was longer than the sheet and was used to attach the sheet to the rear of the clamshell. The front of the sheet was attached to the grill surface by two clips which simply held the sheet in place using friction.

A sheet of dense, high tensile strength ePTFE was obtained measuring approximately 22 inches (56 cm) by 19 inches (48 cm) by 0.003 inch (0.076 mm) thick and having the following properties: density of 2.1 g/cc, tensile strength in two orthogonal directions of at least 20,000 psi (138,000 KPa), thermal resistance of about 1.48° C.-in$^2$/W, a tear resistance of 1.9 lbs/mil in the strongest direction and 1.6 lbs/mil in the orthogonal direction. One edge on the 19 inch (48 cm) side was folded and creased to give a 1 3/16 inch overlap. A strip of 0.001 inch (0.025 mm) thick PFA (Part No. 100, E. I. du Pont de Nemours, Inc., Wilmington, Del.), measuring 3/8 inch (9.5 mm) wide and approximately 19 inches (48 cm) long was inserted inside the folded edge of the dense ePTFE and held in place with masking tape.

A Vertrod heat sealing machine (Vertrod, Inc., Model number 12EP/P-1/2WC-CAN-HOV-SP) was used to apply heat and pressure to the folded edge. Settings on the machine were as follows:

| Mode | Tempulse |
|---|---|
| Upper temperature set point | 705° F. |
| Lower temperature set point | 200° F. |
| Powerstat | 70% |
| Proportioning timer | 35 seconds |
| Pressure (gauge) | 100 psi |

With the heat sealer set to these conditions, the folded edge of ePTFE with PFA strip was inserted between the machine jaws and the bonding cycle started. Eight bonding cycles were used to bond the entire edge.

The sides of the grill cover were then final trimmed to a 12 inch by 22 inch size (30 cm by 56 cm) to match the size of the clamshell grill upper platen. The device was installed on one of the two upper platens of the clamshell grill, and a commercially available release sheet (Teflon Release Sheet, Part # 1799303, Taconic, Inc., Petersburgh, N.Y.) was installed on the other upper platen. Hamburgers were cooked under the same conditions (temperature, gap, pressure, time) using both the commercial release sheet and the sheet of the present invention to demonstrate performance of the grill cover device. It was observed that the cooked hamburgers released easily from the inventive grill cover upon completion of cooking, and the hamburgers appeared visually to have a more desirable sear on the cooked surfaces when compared to the hamburgers cooked in contact with the commercial release sheet.

Example 2

A cooking surface was fabricated as described in Example 1, except that the starting material was a sheet of dense, high tensile strength ePTFE measuring approximately 22 inches (56 cm) by 19 inches (48 cm) by 0.0003 inch (0.0076 mm) thick and having the following properties: density of 2.1 g/cc, tensile strength in two orthogonal directions of at least 15,000 psi (103,000 KPa), thermal resistance of about 0.45° C.-in$^2$/W, a tear resistance of 1.5 lbs/mil in the strongest direction and 0.67 lbs/mil in the orthogonal direction.

The device was installed on one of the two upper platens of the clamshell grill, and a commercially available release sheet (Teflon Release Sheet, Part # 1799303, Taconic, Inc., Petersburgh, N.Y.) was installed on the other upper platen. Hamburgers were cooked under the same conditions (temperature, gap, pressure, time) using both the commercial release sheet and the sheet of the present invention to demonstrate performance of the grill cover device. It was observed that the cooked hamburgers released easily from the inventive grill cover upon completion of cooking, and the hamburgers appeared visually to have a more desirable sear on the cooked surfaces when compared to the hamburgers cooked in contact with the commercial release sheet.

Example 3

A stainless steel plate useable as a cooking surface with an easy release surface of the present invention was fabricated by the following technique.

A laminated sheet of dense, high tensile strength ePTFE with a PFA adhesive on one side was obtained measuring approximately 4 inches (10 mm) by 4 inches (10 mm) and 0.002 inches (0.05 mm) thick, and having the following properties: PTFE density of 2.1 g/cc, PTFE thickness of about 0.0018 inch (0.046 mm), laminate tensile strength in two orthogonal directions of at least 9000 psi, thermal resistance of about 1.088° C.-in$^2$/W, a tear resistance of 1.1 lbs/mil in the strongest direction and about 0.16 lbs/mil in the orthogonal direction.

A 304 stainless steel plate measuring about 1/16 inch thick was cut to 4 inches by 4 inches, as shown in FIG. 3 as 25. The plate was cleaned in a hot soap bath, followed by a hot water rinse. The plate was cleaned again with 1,1,2 trichlorotrifluoroethane and 99.9% pure isopropanol with less than 0.0005% residual. The laminate was placed on the cooking surface of the plate with the PFA side against the cooking surface. Polyimide sheets 0.001 inches thick (Kapton HN100, E.I DuPont de Nemours, Circleville, Ohio) were used as release agents. One was placed under the stainless steel plate and another was placed over the ePTFE sheet. This assembly was placed in a heat press which was heated to a temperature of 340° C., and a pressure of at least 50 psi was applied. This temperature was maintained for about 30 seconds. The plate was cooled to 50°

C. then removed from the press. The laminate was well-adhered to the stainless steel plate.

Example 4

A stainless steel plate useable as a cooking surface with an easy release surface of the present invention was fabricated as described in Example 3, except that the starting laminated sheet was a laminate of dense, high tensile strength ePTFE with an FEP adhesive on one side measuring approximately 4 inches (10 mm) by 4 inches (10 mm) and 0.0007 inches (0.018 mm) thick, and having the following properties: PTFE density of 2.1 g/cc, PTFE thickness of about 0.0004 inch (0.010 mm), overall tensile strength in two orthogonal directions of at least 9000 psi, thermal resistance of about 0.71° C.-in$^2$/W, a tear resistance of 1.5 lbs/mil in the strongest direction and about 0.3 lbs/mil in the orthogonal) direction.

Example 5

A belt suitable for conveying and at least partially cooking food was fabricated by the following technique. A length of dense, high tensile strength ePTFE sheet as described in Example 1 measuring about 20 inches (51 mm) by 6 inches (15 mm) was looped into a circle of approximately 6 inches (15 mm) in diameter (also generally shown in FIGS. 4A and 4B, in cross-section along line a-a). The circle had a region about ⅜ in. in length where the ends of the sheet were overlapped. A strip of 0.001 inch (0.025 mm) thick PFA (Part No. 100, E. I. du Pont de Nemours, Inc., Wilmington, Del.), measuring about ⅜ inch (9.5 mm) wide and approximately 6 inches (15 mm) long was inserted between the overlapped edges of the sheet dense ePTFE and held in place with masking tape. Sheets of polyimide (Kapton HN100, E.I DuPont de Nemours, Circleville, Ohio) were used as release agents when heat bonding the overlapped region using the Vertrod heating rod.

Using a Vertrod heat sealing machine with the heat sealer set to the conditions described in Example 1, the folded edge of dense ePTFE with PFA strip was inserted between the machine jaws and the bonding cycle started. When completed, the bonded section was removed and an unbonded section reinserted between the jaws. Eight bonding cycles were used to bond the entire edge.

The loop was then final trimmed to a 6 inch (15 cm) wide by 6 inch (15 cm) diameter belt.

Example 6

An aluminum sheet useable as a cooking surface with an easy release surface of the present invention was fabricated. A violet color FEP film (St. Gobain, Wayne, N.J.) and a dense, high tensile strength ePTFE were obtained. The ePTFE film had the following properties: 0.000635 mm thickness, 2.0 g/cc density, tensile strength in two orthogonal directions of at least 8,000 psi (55,000 KPa), thermal resistance of about 0.44° C.-in$^2$/W, a tear resistance of 1.9 lbs/mil in the strongest direction and 0.15 lbs/mil in the orthogonal direction.

The two materials were combined in the following manner:
a) contacting the dense PTFE with the FEP film;
b) heating the composition obtained in step a) to a temperature above the melting point of the FEP;
c) stretching the heated composition of step b) while maintaining the temperature above the melting point of the FEP; and
d) cooling the product of step c).

This coated sheet was then laminated to a 0.0002 inch thick aluminum foil with a layer of 0.00015 inch thick pressure sensitive adhesive (PSA) silicone adhesive (GE part no. 518, Waterford, N.Y.). The resulting laminate had the following properties: approximately 6 inches (15 cm) by 6 inches (15 cm) by 0.0006 inch (0.015 mm) thick, tensile break force of 2 lb (0.91 kg), thermal resistance of about 0.485° C.-in$^2$/W, tear resistance in the strongest direction of 0.85 lbs/mil and 0.10 lbs/mil in the orthogonal direction.

The device was installed on one of the two upper platens of the clamshell grill describe in Example 3, and a commercially available release sheet (Teflon Release Sheet, Part # 1799303, Taconic, Inc., Petersburgh, N.Y.) was installed on the other upper platen. Hamburgers were cooked under the same conditions (temperature, gap, pressure, time) using both the commercial release sheet and the sheet of the present invention to demonstrate performance of the grill cover device. It was observed that the cooked hamburgers released easily from the inventive grill cover upon completion of cooking, and the hamburgers appeared visually to have a more desirable sear on the cooked surfaces when compared to the hamburgers cooked in contact with the commercial release sheet.

We claim:
1. A method for improving the non-enzymatic browning on the surface of food comprising
placing said food on the surface of a PTFE sheet, said PTFE sheet having a density of 2.0 g/cc or more, a tensile strength of at least 8000 psi in two orthogonal directions, a surface thickness of up to about 2 mil and a thermal resistance of 1.3° C. in $^2$/W or less, and said PTFE sheet being in contact with a heat source on the surface of the PTFE sheet opposite the surface in contact with the food; and
non-enzymatically browning the surface of the food.
2. A method for cooking food comprising
placing said food on the surface of a PTFE sheet, said PTFE sheet having a density of 2.0 g/cc or more, a tensile strength of at least 8000 psi in two orthogonal directions, a surface thickness of up to about 2 mil and a thermal resistance of 1.3° C. in $^2$/W or less, and said PTFE sheet being in contact with a heat source on the surface of the PTFE sheet opposite the surface in contact with the food.
3. A method for cooking food comprising
placing said food on the surface of a PTFE sheet, said PTFE sheet having a surface comprising a polytetrafluoroethylene (PTFE) sheet having a thermal resistance of 1.3° C. in$^2$/W or less, a surface thickness of up to about 2 mil and a tensile strength of at least 10,000 psi in at least one direction.
4. The method of claim 2, wherein said sheet has a density of 2.1 g/cc.
5. The method of claim 2, wherein said sheet has a thermal resistance of 1.0° C. in $^2$/w or less.
6. The method of claim 2, wherein said sheet has a thermal resistance of 0.5° C. in $^2$/w or less.
7. The method of claim 3, wherein said sheet has a thermal resistance of 1.0° C. in $^2$/w or less.
8. The method of claim 3, wherein said sheet has a thermal resistance of 0.5° C. in $^2$/w or less.

* * * * *